(12) United States Patent
Brahmadathan et al.

(10) Patent No.: US 12,411,778 B2
(45) Date of Patent: *Sep. 9, 2025

(54) ADVANCED INITIALIZATION BUS (AIB)

(71) Applicant: Ampere Computing LLC, Santa Clara, CA (US)

(72) Inventors: Sandeep Brahmadathan, Dublin, CA (US); Danh La, Ho Chi Minh (VN)

(73) Assignee: Ampere Computing LLC, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/677,623

(22) Filed: May 29, 2024

(65) Prior Publication Data

US 2024/0320165 A1 Sep. 26, 2024

Related U.S. Application Data

(63) Continuation of application No. 17/810,244, filed on Jun. 30, 2022, now Pat. No. 12,019,565.

(51) Int. Cl.
*G06F 13/12* (2006.01)
*G06F 13/16* (2006.01)
*G06F 13/42* (2006.01)

(52) U.S. Cl.
CPC ........ *G06F 13/126* (2013.01); *G06F 13/1673* (2013.01); *G06F 13/4291* (2013.01)

(58) Field of Classification Search
CPC . G06F 13/4291; G06F 13/1673; G06F 13/126
See application file for complete search history.

(56) References Cited

U.S. PATENT DOCUMENTS

| | | | |
|---|---|---|---|
| 10,241,938 B1* | 3/2019 | Sim | G06F 13/4239 |
| 11,500,770 B2* | 11/2022 | Yanagidaira | G06F 13/16 |
| 12,019,565 B2* | 6/2024 | Brahmadathan | G06F 13/4291 |
| 2019/0287585 A1* | 9/2019 | Iijima | G11C 7/1006 |
| 2022/0012190 A1* | 1/2022 | Cheng | G06F 13/4282 |

* cited by examiner

*Primary Examiner* — Phong H Dang
(74) *Attorney, Agent, or Firm* — Muncy, Geissler, Olds & Lowe, P.C.

(57) ABSTRACT

Methods and systems for an advanced initialization bus (AIB) are presented. In an aspect, an AIB master sends, to an AIB slave, a serial clock over a first signal line, and performs a read operation with the AIB slave. Performing the read operation comprises sending a read command to the AIB slave via a bus comprising at least one bidirectional input/output (I/O) channel, each I/O channel having its own respective signal line, sending a read address to the AIB slave via the bus, receiving a copy of the serial clock from the AIB slave over a second signal line, and latching read data provided by the AIB slave via the bus into a read buffer using the copy of the serial clock as a data strobe. Thus, the AIB master latches the read data provided by the AIB slave using a read strobe also provided by the AIB slave.

18 Claims, 10 Drawing Sheets

ADVANCED INITIALIZATION BUS (AIB)

CROSS-REFERENCE TO RELATED APPLICATION

The present application for patent is a Continuation of U.S. patent application Ser. No. 17/810,244, filed Jun. 30, 2022, entitled "ADVANCED INITIALIZATION BUS (AIB)", which is assigned to the assignee hereof and is expressly incorporated herein by reference in its entirety.

BACKGROUND

I. Field of the Disclosure

Aspects of the disclosure relate generally to techniques for evaluating and debugging multi-chip module (MCM) design and performance, and specifically to techniques for communicating reliably and at a high frequency between an initiator chiplet and a target chiplet in a multi-chip module.

II. Background

Multi-chip modules (MCMs) conventionally include multiple dies or chiplets mounted to a substrate that contains traces for power, ground, and inter-chip communication. A common configuration includes a main die, which may be a compute chiplet, that communicates with other dies, which may be other compute chiplets or chiplets that provide I/O, memory, or other peripheral functions. In MCMs that have a die that controls other dies on the MCM, that die may be referred to as a "master die" or a "main die" and the other dies that are controlled by the main die may be referred to "slave dies" or "subsidiary dies". As used herein, the terms "die" and "chiplet" are treated synonymously.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method includes sending, to a bus slave, a serial clock over a first signal line; and performing a bus operation with the bus slave, the bus operation comprising a read operation or a write operation; wherein performing the read operation comprises: sending a read command to the bus slave via a bus comprising at least one bidirectional input/output (I/O) channel, each I/O channel having its own respective signal line; sending a read address to the bus slave via the bus; receiving a copy of the serial clock from the bus slave over a second signal line; and latching read data provided by the bus slave via the bus into a read buffer using the copy of the serial clock as a data strobe.

In an aspect, a method includes receiving, from a bus master, a serial clock over a first signal line; and performing a bus operation with the bus master, the bus operation comprising a read operation or a write operation; wherein performing the read operation comprises: receiving a read command from the bus master via a bus comprising at least one bidirectional input/output (I/O) channel, each I/O channel having its own respective signal line; receiving a read address from the bus master via the bus; sending read data to the bus master via the bus according to the serial clock; and sending a copy of the serial clock to the bus master over a second signal line for use by the bus master as a data strobe.

In an aspect, an apparatus for operating as a bus master of a serial bus includes a controller circuit; and at least one input, output, or input/output port; wherein the controller circuit is configured to perform a bus operation with a bus slave, the bus operation comprising a read operation or a write operation; wherein, to perform the read operation, the controller circuit is configured to: send a serial clock to the bus slave over a first signal line; send a read command to the bus slave via a bus comprising at least one bidirectional input/output (I/O) channel, each I/O channel having its own respective signal line; send a read address to the bus slave via the bus; receive a copy of the serial clock from the bus slave over a second signal line; and latch read data provided by the bus slave via the bus into a read buffer using the copy of the serial clock as a data strobe.

In an aspect, an apparatus for operating as a bus slave of a serial bus includes a controller circuit; and at least one input, output, or input/output port; wherein the controller circuit is configured to perform a bus operation with a bus master, the bus operation comprising a read operation or a write operation; wherein, to perform the read operation, the controller circuit is configured to: receive a serial clock from the bus master over a first signal line; receive a read command from the bus master via a bus comprising at least one bidirectional input/output (I/O) channel, each I/O channel having its own respective signal line; receive a read address from the bus master via the bus; send read data to the bus master via the bus according to the serial clock; and send a copy of the serial clock to the bus master over a second signal line for use by the bus master as a data strobe.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION OF THE DRAWINGS

Figure 1:
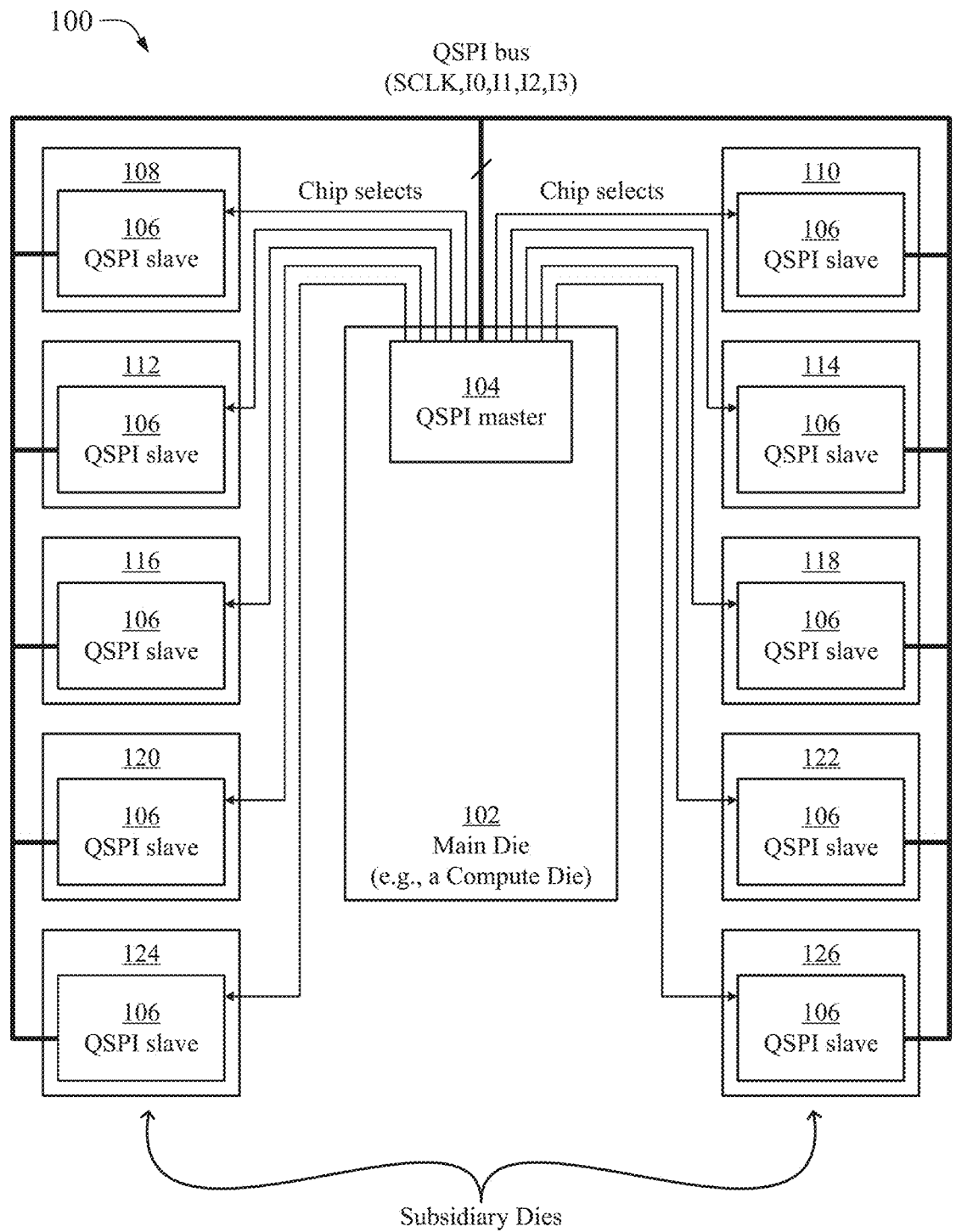
FIG. 1 is a block diagram of a conventional multi-chip module (MCM) using quad serial peripheral interface (QSPI) between dies.

Methods and systems for an advanced initialization bus (AIB) are presented. In an aspect, an AIB master sends, to an AIB slave, a serial clock over a first signal line, and performs a read operation with the AIB slave. Performing the read operation comprises sending a read command to the AIB slave via a bus comprising at least one bidirectional input/output (I/O) channel, each I/O channel having its own respective signal line, sending a read address to the AIB slave via the bus, receiving a copy of the serial clock from the AIB slave over a second signal line, and latching read data provided by the AIB slave via the bus into a read buffer using the copy of the serial clock as a data strobe. Because the AIB slave provides the AIB master with a read strobe for use by the AIB master to latch the read data being provided by the AIB slave, the read strobe will be at the intended location relative to the data transitions on the bus and will thus be more likely to satisfy setup and hold requirements at higher frequencies and/or over longer distances, compared to bus protocols that use a clock provided by the bus master to capture data provided by a bus slave.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

The word "exemplary" is used herein to mean "serving as an example, instance, or illustration." Any implementation described herein as "exemplary" is not necessarily to be construed as preferred or advantageous over other embodiments. Likewise, the term "implementation" does not require that all implementations include the discussed feature, advantage, or mode of operation.

The terminology used herein describes particular implementations only and should not be construed to limit any implementations disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

The serial peripheral interface (SPI) bus is a synchronous serial communication interface specification used for short-distance communication, and is popularly used for communication between dies or chiplets on an MCM. SPI is a four wire bus, having a serial clock line (SCLK), a master out slave in (MOSI) line for data from the master to the slave, a master in slave out (MISO) line for data from the slave to the master, and a chip select (CS)/slave select (SS) line, which the master sets low to indicate that data is being sent.

One variant of SPI is quad-SPI, or QSPI, which has a serial clock line (SCLK), a chip select (CS), and four bidirectional data lines I0, I1, I2, and I3.

FIG. 1 is a block diagram of a conventional multi-chip module (MCM) 100 using QSPI between dies. In the example shown in FIG. 1, the MCM 100 includes a main die 102, e.g., a compute die. The main die 102 includes a QSPI master 104 that controls a QSPI bus that is connected to at least one QSPI slave 106.

In the example illustrated in FIG. 1, the MCM 100 has ten different dies: die 108, die 110, die 112, die 114, die 116, die 118, die 120, die 122, die 124, and die 126, which may be collectively referred to herein as the subsidiary dies. A subsidiary die may be an I/O die, a memory die, or other type of peripheral. In the example shown in FIG. 1, the QSPI master 104 on the main die 102 provides a unique CS line to each of the subsidiary dies. The QSPI signals SCLK, I0, I1, I2, and I3 are common to all QSPI slaves 106.

Figure 2:
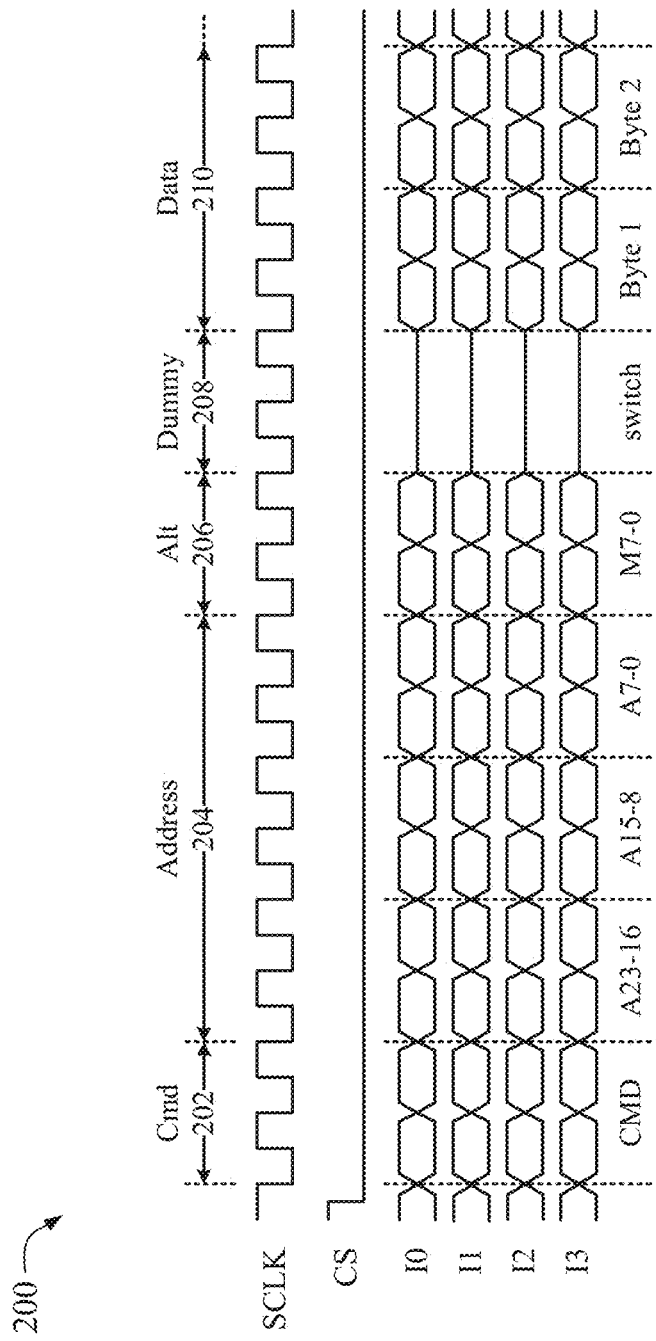
FIG. 2 is a timing diagram of signals transmitted on a QSPI bus.

FIG. 2 is a timing diagram 200 of signals transmitted on a QSPI bus. Values on the QSPI signals I0-I3 change on the falling edge of SCLK and are latched on the rising edge of SCLK. When a QSPI slave 106 detects that its low-active chip select has gone active, it reads an 8-bit command during the command phase 202, reads a 24-bit address during the address phase 204, and reads a byte of additional information during the alt phase 206. The dummy phase 208 is used to switch the direction of the I0-I3 lines (if needed), and bytes of data are provided during the data phase 210 until all of the data has been written or read.

Figure 3:
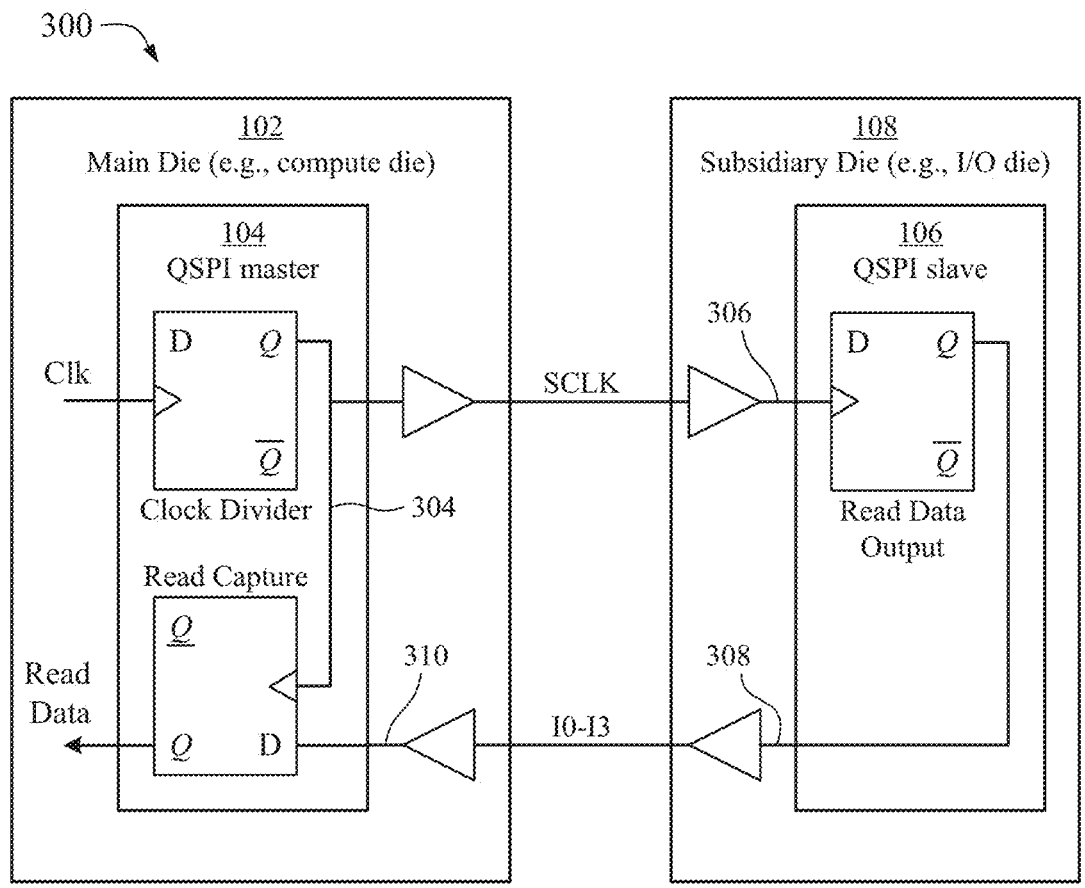
FIG. 3 illustrates a simplified schematic and timing waveforms of a QSPI bus.
Figure 3:
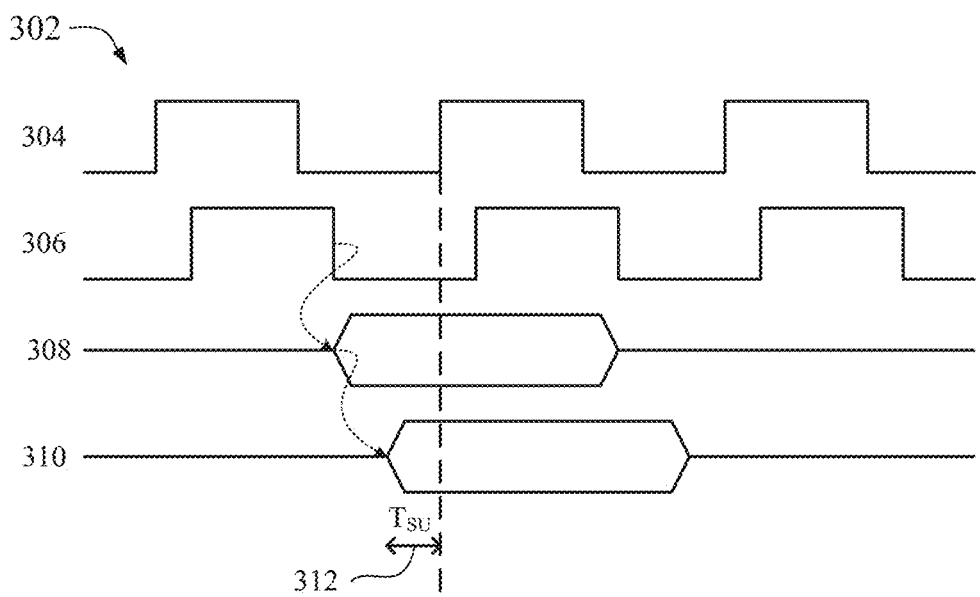

FIG. 3 illustrates a simplified schematic 300 and timing waveforms 302 of a QSPI bus implementation, showing why the QSPI bus has limits on the frequency of the SCLK and the length of I0-I3 between a QSPI master 104 on a main die 102 and a QSPI slave 106 on a subsidiary die 108. In the example shown in FIG. 3, the QSPI master 104 uses a clock (Clk) provided by the main die 102 (or by the QSPI master 104 itself), which is divided by a clock divider and output as SCLK. SCLK is buffered by the main die 102 after being output by the QSPI master 104 and buffered again by the subsidiary die 108 before being provided to the QSPI slave 106. Due to the physical distance between the main die 102 and the subsidiary die 108 as well as the delay through the two buffers, the timing of the SCLK 304 seen by the read capture latch in the QSPI master 104 will be different from the timing of the SCLK 306 seen by the read data output latch of the QSPI slave 106. Specifically, the SCLK 306 will be delayed relative to the SCLK 304.

This is shown in more detail in the timing waveform 302. The falling edge of SCLK 306 is delayed relative to the falling edge of SCLK 304. Read data is provided by the QSPI slave 106 over I0-I3 at the falling edge of SCLK 306, but takes time to propagate through the output buffers on the subsidiary die 108, across the distance between the subsidiary die 108 and the main die 102, and propagate through the input buffers on the main die 102, before being latched by the read capture latch within the QSPI master 104. As a result, the timing of the read data 310 as it arrives at the QSPI master 104 is delayed relative to the timing of the read data 308 output by the QSPI slave 106.

This results in a situation in which the read data 310 arrives within the QSPI master 104 delayed relative to the internal SCLK signal 304 that is used to latch the read data 310. As the frequency of SCLK goes up and/or the distance between the QSPI slave 106 and the QSPI master 104 increases, the setup time (Tsc) 312 gets shorter and shorter, until eventually the QSPI master 104 fails to correctly latch data from the QSPI slave 106. This difference in clock timing limits the maximum frequency of a QSPI bus and the distance that a QSPI bus may travel within an MCM at any particular frequency.

To overcome the limitations of the QSPI bus, an advanced initialization bus (AIB) is provided. The AIB includes serial clock SCLK, a four-bit data address/data channel I0-I3, a chip select CS, and a control/clock (CC) signal that an AIB master can use to assert a bus wait state during a write operation and that an AIB slave can use to both assert a wait state during a read operation and provide the AIB master with a data latching signal, also referred to as a data strobe, that will be synchronized with the transitions of read data I0-I3. During a read, the AIB master will use the slave-provided data strobe to capture data on I0-I3 into an asynchronous first-in, first-out (AFIFO) buffer, which can then be read by AIB master using the master-side clock.

Figure 4:
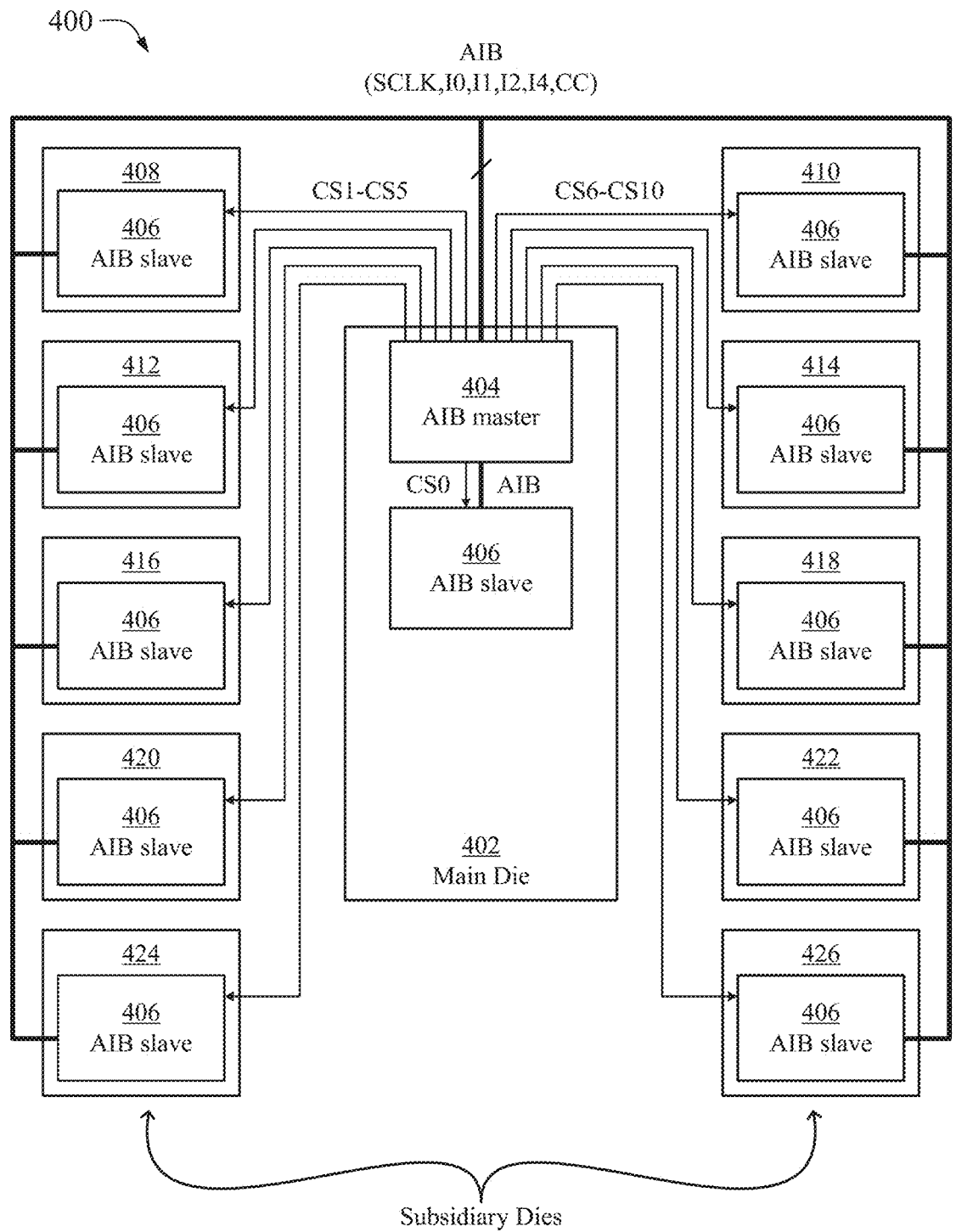
FIG. 4 is a block diagram of an exemplary MCM using an advanced initialization bus (AIB), according to aspects of the disclosure.

FIG. 4 is a block diagram of an example MCM 400 using an advanced initialization bus (AIB) between dies or chiplets. In the example shown in FIG. 4, the MCM 400 includes a main die 402, which includes an AIB master 404 that controls an AIB bus that is connected to at least one AIB slave 406. In the example shown in FIG. 4, the main die 402 also has one AIB slave 406. Since one purpose of the AIB is to execute initial programming of various components of the main die and other dies, the main die itself may be a target for the AIB initiator.

In the example illustrated in FIG. 4, the MCM 400 has ten different dies: die 408, die 410, die 412, die 414, die 416, die 418, die 420, die 422, die 424, and die 426, which may be collectively referred to herein as the subsidiary dies. A subsidiary die may be an I/O die, a memory die, or other type of peripheral. In the example shown in FIG. 4, the AIB master 404 on the main die 402 provides a unique CS line to each of the subsidiary dies. The AIB signals SCLK, I0, I1, I2, I3, and CC are common to all AIB slaves 406, including the AIB slave within the main die 402. As will be shown in more detail, CC operates as a wait control provided from an AIB master to an AIB slave during a write to the AIB slave, and as a read latch signal provided from the AIB slave to the AIB master during a read from the AIB slave.

Figure 5:
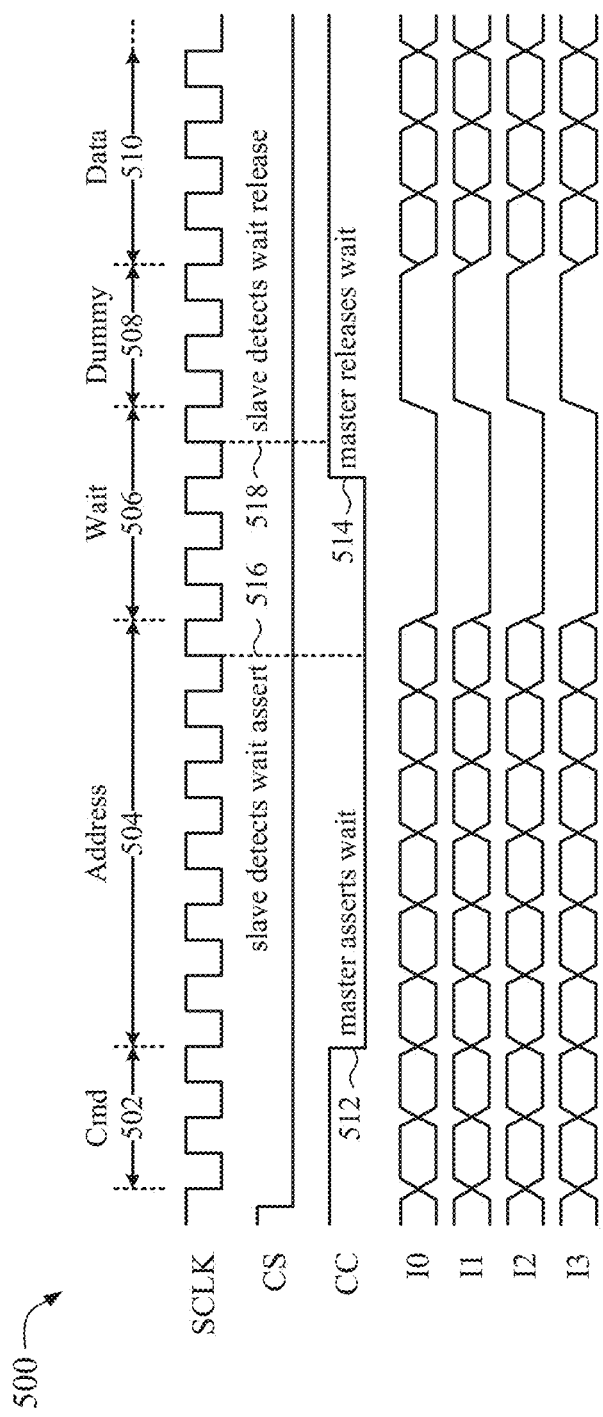
FIG. 5 is a timing diagram of signals transmitted over an AIB during a write, according to aspects of the disclosure.

FIG. 5 is a timing diagram 500 of signals transmitted over an AIB during a write, according to aspects of the disclosure. Values on the AIB signals I0-I3 change on the falling edge of SCLK and are latched on the rising edge of SCLK. When an AIB slave 406 detects that its low-active chip select has gone active, it reads an 8-bit command during the command phase 502, and reads a 24-bit address during the address phase 504. After the address phase 504, there is an optional wait phase 506, a dummy phase 508, and a data phase 510.

In the example illustrated in FIG. 5, if the AIB master 404 wants to assert a wait state during the write operation, the AIB master 404 will assert a wait (in one aspect, by driving the CC line to a logic low 512), and then release the wait (in one aspect, by driving the CC line to a logic high 514). In the example shown in FIG. 5, the AIB master 404 asserts a wait after the completion of the command phase 502, but other implementations are possible. In the example shown in FIG. 5, the wait is asserted after the command phase 502 but does not take effect until after the address phase 504, as wait phase 506. If the AIB slave 406 detects a logic low on the CC line 516, the AIB slave 406 will wait until it detects that the AIB master 404 has released the wait, e.g., by detecting that the CC line has been set to a logic high 518 by the AIB master 404. The dummy phase 508 starts after the wait phase 506 ends (or after the address phase 504 ends, if there was no wait asserted by the master). Following the dummy phase 508 is the data phase 510, during which bytes of data are provided at each two clock cycles after that until all of the data has been written or read.

Figure 6:
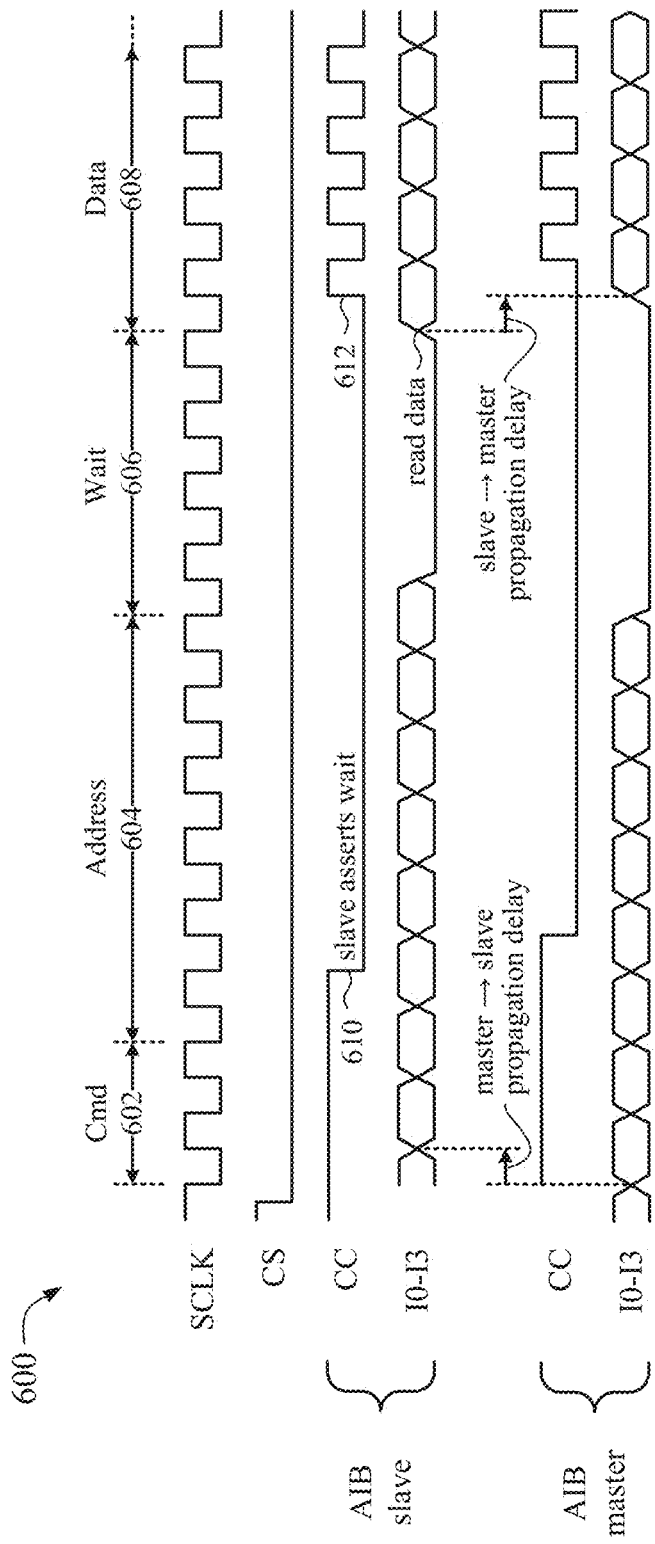
FIG. 6 is a timing diagram of signals transmitted over an AIB during a read, according to aspects of the disclosure.

FIG. 6 is a timing diagram 600 of signals transmitted over an AIB during a read, according to aspects of the disclosure. When an AIB slave 406 detects that its low-active chip select has gone active, it reads an 8-bit command during the command phase 602, and reads a 24-bit address during the address phase 604. After the address phase 604, there is an optional wait phase 606, and a data phase 608.

When the command sent by the AIB master 404 during the command phase 602 is a read, after the command phase 602, the AIB master 404 relinquishes control of the CC line so that the AIB slave 406 can use the CC line. In the example illustrated in FIG. 6, if the AIB slave 406 wants to assert a wait state, it may do so by holding the CC line to a value that indicates a wait assert (e.g., holding it low 610). If the AIB slave 406 has asserted a wait, then the wait phase 606 starts after the end of the address phase 604. In some aspects, the AIB slave 406 may continue to assert the wait for however many cycles of wait are needed, and will signal to the AIB master 404 that the data is ready to be latched by toggling the CC line (e.g., the rising edge 612). In some aspects, the AIB slave 406 sends its internal SCLK back to the AIB master 404 via the CC line, which the AIB master uses to latch the read data from I0-I3. Thus, the CC line operates both as a wait state indicator and as a data strobe.

FIG. 6 shows the timing of the data on I0-I3, and also shows both the timing of the CC and I0-I3 signals as seen from the AIB slave 406 and the timing of the CC and I0-I3 signals as seen from the AIB master. In the example shown in FIG. 6, during the command and address phases, the transitions on I0-I3 at the AIB slave 406 occur slightly after the transitions on I0-I3 at the AIB master 404, due to the master-to-slave propagation delay. During the data phase, however, the transitions on I0-I3 at the AIB master 404 occur slightly after the transitions on I0-I3 at the AIB slave 406, due to the slave-to-master propagation delay. To counteract this timing difference, the AIB slave 406 effectively sends its internal SCLK back to the AIB master 404 via the CC line, which the AIB master uses to latch the read data from I0-I3. Since the data being output by the AIB slave 406 is triggered by its internal SCLK, the AIB slave's SCLK that is being sent to the AIB master 404 via the CC line will have timing that is closely related to the timing of the data transitions on I0-I3.

Figure 7:
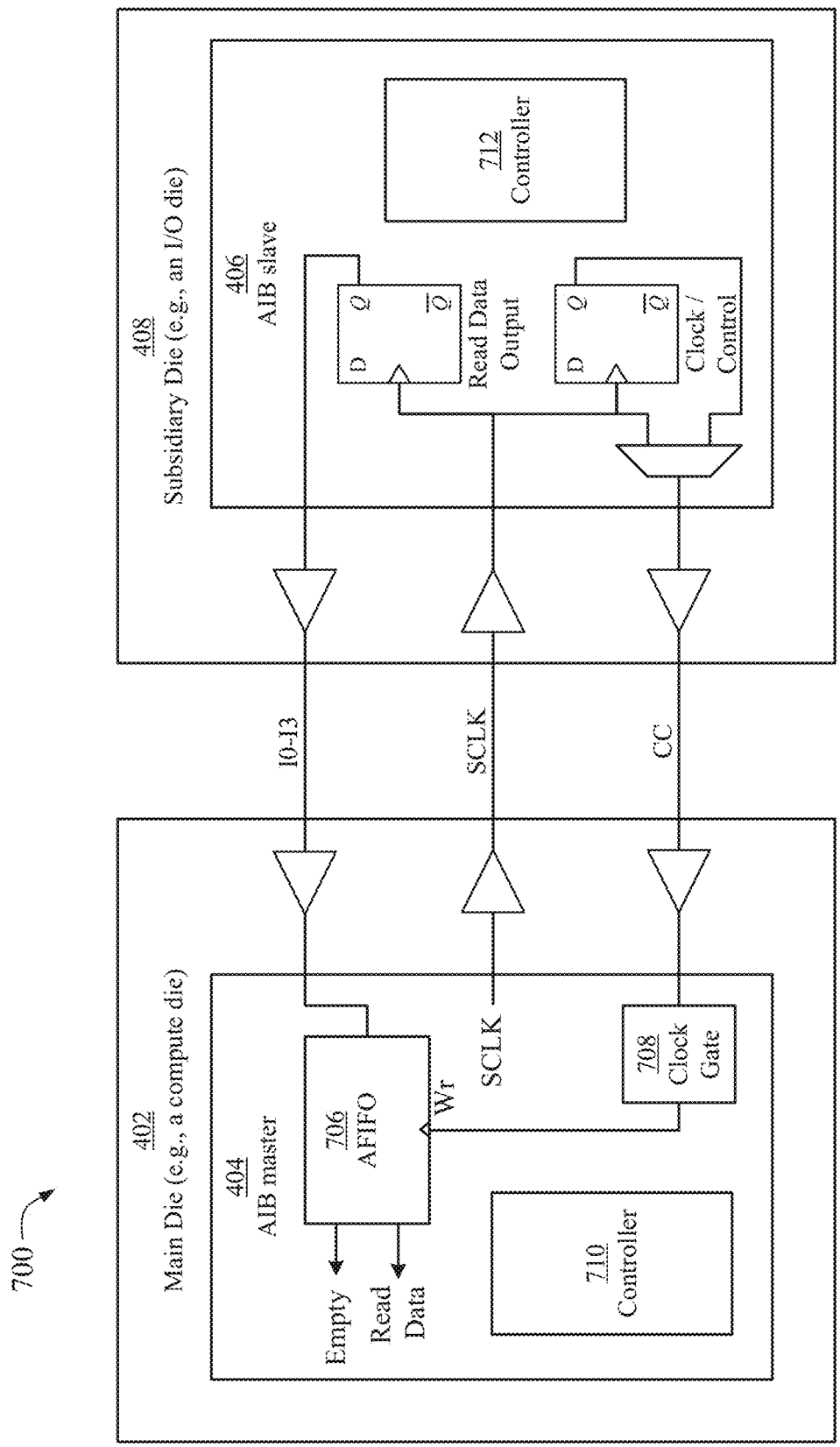
FIG. 7 is a simplified schematic of an AIB implementation, according to aspects of the disclosure.

FIG. 7 is a simplified schematic 700 of an AIB implementation, according to aspects of the disclosure. In the example illustrated in FIG. 7, a main die 402 includes an AIB master 404 that is connected to an AIB slave 406 on a subsidiary die 408. In the example illustrated in FIG. 7, the SCLK is provided by the AIB master 404, buffered by the main die 402, and sent to the subsidiary die 408, which buffers it again and provides it to the AIB slave 406. An active chip select line (not shown in FIG. 7) will reset storage elements (e.g., latch 702, latch 704, flipflops, etc.) within the AIB slave 406.

In the example shown in FIG. 7, within the AIB slave 406 the SCLK is used to clock the read data output latches 702. The read data is buffered by the subsidiary die 408 and sent back to the main die 402 via I0-I3. While the read data is being sent over I0-I3, the AIB slave 406 will route the SCLK that the AIB slave 406 received, through the clock/control latch 704, and back to the AIB master 404, via the CC line. The AIB master 404 will use this signal to capture the data on I0-I3 into an asynchronous first-in, first-out buffer (AFIFO) 706. The main die 402 can then read the data out of the AFIFO 706 asynchronously, e.g., according to the internal clock of the main die 402 or the AIB master 404. In the embodiment illustrated in FIG. 7, the AFIFO 706 provides an EMPTY signal to indicate when the AFIFO 706 is empty. In the embodiment illustrated in FIG. 7, the AIB master 404 includes a clock gate 708, which suppresses the clocked write signal to the AFIFO 706 when the AIB slave is not expected to provide that signal, to prevent system noise or noise on the CC line from erroneously writing data to the AFIFO 706. In the embodiment illustrated in FIG. 7, the AIB master 404 includes a controller 710 for handling the AIB master operation and/or other functions, and the AIB slave 406 includes a controller 712 for handling the AIB slave operation and/or other functions.

Figure 8:
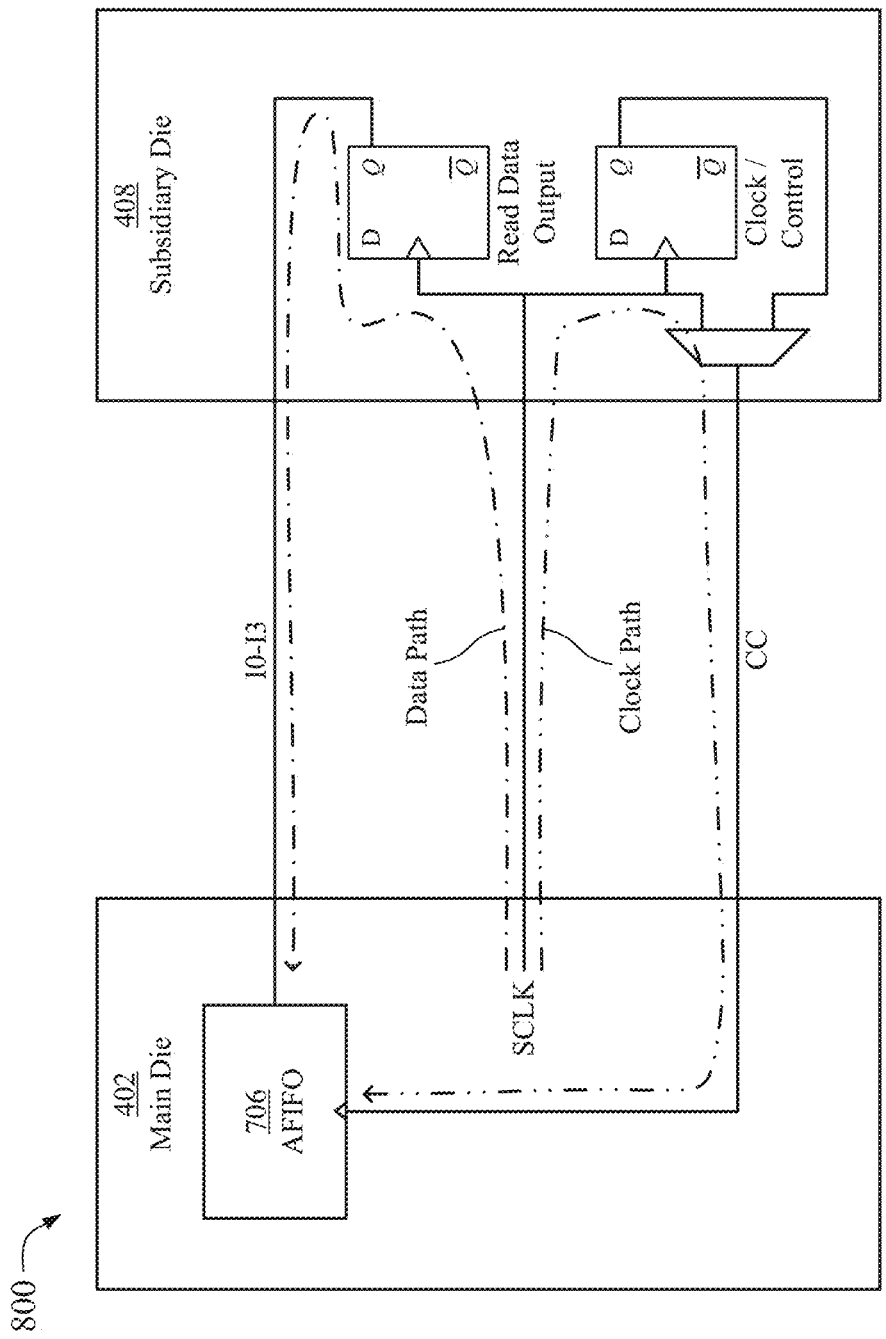
FIG. 8 illustrates a simplified read timing margin analysis of the simplified circuit shown in FIG. 7.

FIG. 8 illustrates a simplified read timing margin analysis 800 of the simplified circuit shown in FIG. 7. The data path, which is from the SCLK output of the main die 402, through the read data output 702 on the subsidiary die 408, and back to the main die 402 via I0-I3, is approximately the same length as the clock path, which is from the SCLK output of the main die 402, through the clock/control latch 704 on the subsidiary die 408, and back to the main die 402 via CC. As a result, the total delay through the data path differs from the total delay through the clock path by less than 2 ns, in one aspect. For an SCLK period of 10 ns, a 2 ns delay mismatch still gives 3 ns of setup and hold.

Figure 9A:
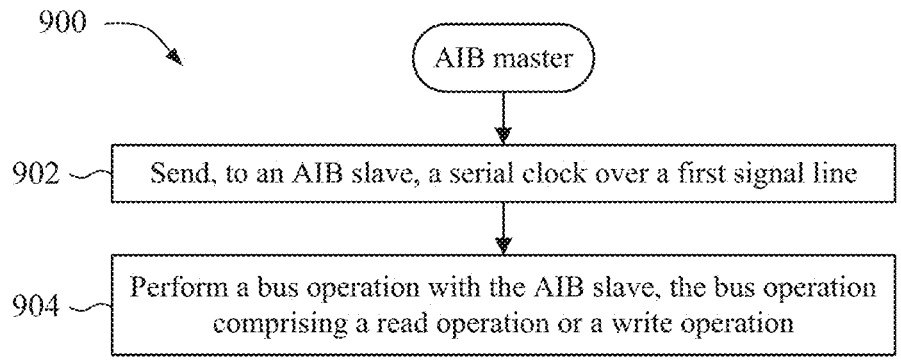
FIG. 9A and FIG. 9B are flowcharts illustrating portions of an example process, performed by an AIB master, according to aspects of the disclosure.
Figure 9B:
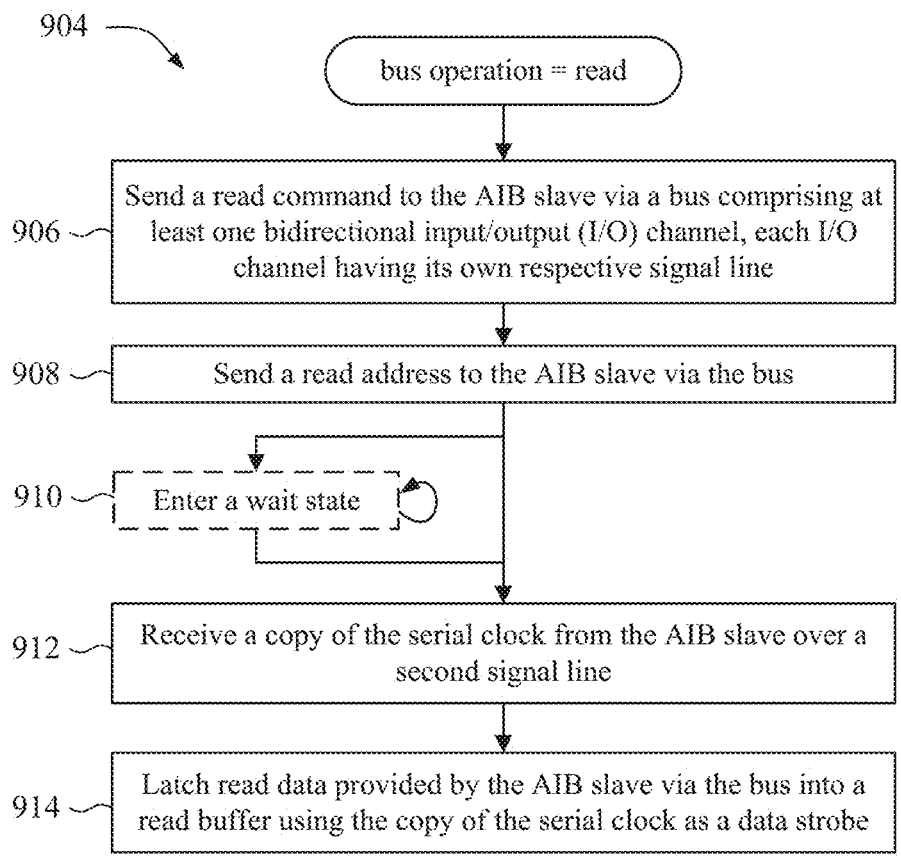

FIG. 9A and FIG. 9B are flowcharts illustrating portions of an example process 900 associated with communication over an AIB, according to aspects of the disclosure. In some implementations, one or more process blocks of FIGS. 9A and 9B may be performed by a bus master (e.g., AIB master 404). In some implementations, one or more process blocks of FIGS. 9A and 9B may be performed by another device or a group of devices separate from or including the bus master. Additionally, or alternatively, one or more process blocks of FIGS. 9A and 9B may be performed by one or more components of an apparatus, any or all of which may be means for performing the operations of process 900.

As shown in FIG. 9A, process 900 may include, at block 902, sending, to a bus slave, a serial clock over a first signal line. Means for performing the operation of block 902 may include any component of any of the apparatuses described herein. For example, the AIB master 404 may send SCLK to the AIB slave 406. The AIB master 404 and the AIB slave 406 may be on different dies, as shown in FIG. 7, or on the same die, such as the main die 402 shown in FIG. 4.

As further shown in FIG. 9, process 900 may include, at block 904, performing a bus operation with the bus slave, the bus operation comprising a read operation or a write operation. Means for performing the operation of block 904 may include any component of any of the apparatuses described herein. For example, the AIB master 404 may perform a bus operation with the AIB slave 406.

FIG. 9B illustrates operations that are performed by the bus master during a read operation. As shown in FIG. 9B, the read operation 904 may include, at block 906, sending a read command to the bus slave via a bus comprising at least one bidirectional input/output (I/O) channel, each I/O channel having its own respective signal line. The read operation 904 may further include, at block 908, sending a read address to the bus slave via the bus.

The read operation 904 may optionally include, at block 910, entering a wait state. In some aspects, this may comprise detecting assertion of a wait state by the AIB slave 406. In some aspects, the AIB slave 406 may assert a wait state by driving the CC signal to a value that indicates assertion of the wait state to the AIB master 404 (in some aspects, a logic "0"). The AIB master 404 remains in the wait state until it determines that the wait state is over.

The read operation 904 may further include, at block 912, receiving a copy of the serial clock from the bus slave over a second signal line, e.g., the CC signal, and, at block 914, latching read data provided by the bus slave via the bus into a read buffer using the copy of the serial clock as a data strobe. If the AIB master 404 entered the wait state in optional block 910, detecting the serial clock on the CC signal is an event that notifies the AIB master 404 that the wait state is over.

In some aspects, the bus comprises four bidirectional I/O channels.

In some aspects, latching the read data into the read buffer using the copy of the serial clock as the data strobe comprises latching the read data into an asynchronous first-in, first-out (AFIFO) buffer and using the copy of the serial clock as a write signal.

In some aspects, the bus operation is a write operation. In some aspects, performing the write operation comprises sending a write command to the bus slave via the bus, sending a write address to the bus slave via the bus, and sending write data to the bus slave via the bus. In some aspects, performing a write operation includes, after sending the write address but before sending the write data, asserting and later releasing a wait state, via the second signal line.

Process 900 may include additional implementations, such as any single implementation or any combination of implementations described below and/or in connection with one or more other processes described elsewhere herein. Although FIGS. 9A and 9B show example blocks of process 900, in some implementations, process 900 may include additional blocks, fewer blocks, different blocks, or differently arranged blocks than those depicted in FIGS. 9A and 9B. Additionally, or alternatively, two or more of the blocks of process 900 may be performed in parallel.

Figure 10A:
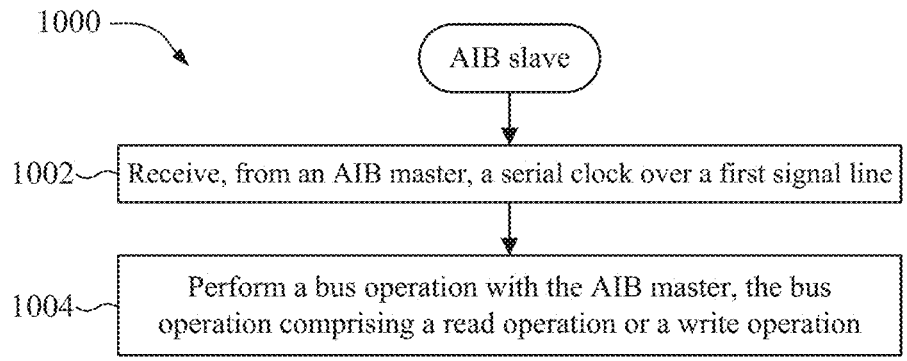
FIG. 10A and FIG. 10B are flowcharts illustrating portions of an example process, performed by an AIB slave, according to aspects of the disclosure.
Figure 10B:
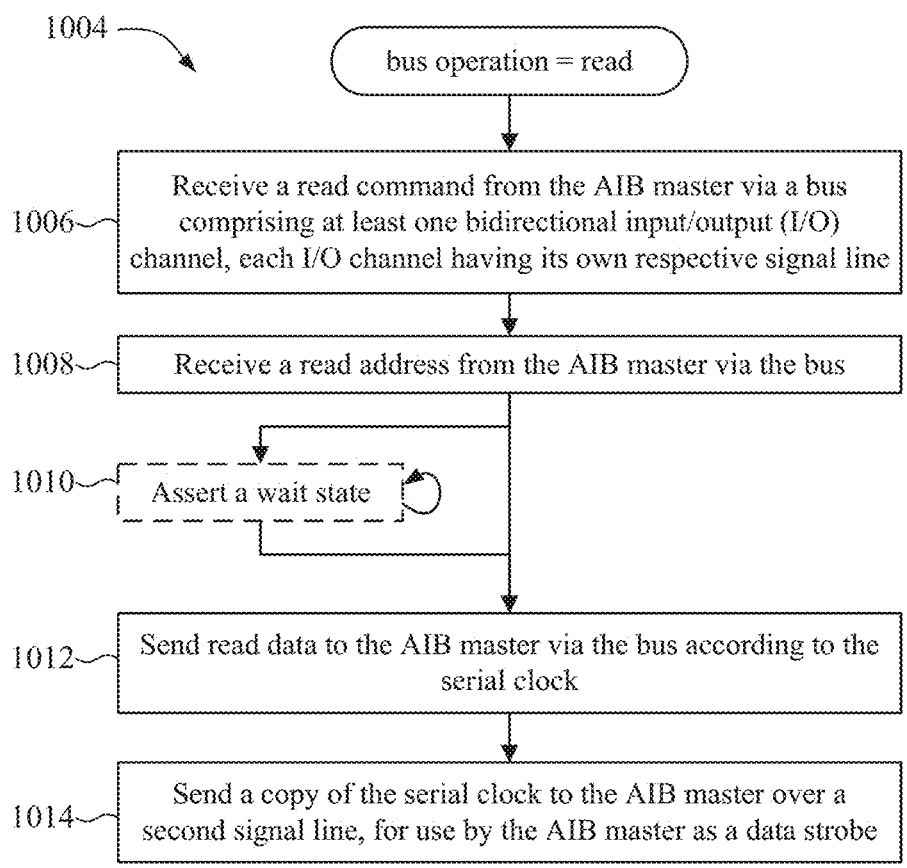

FIG. 10A and FIG. 10B are flowcharts illustrating portions of an example process 1000 associated with communication over an AIB, according to aspects of the disclosure. In some implementations, one or more process blocks of FIGS. 10A and 10B may be performed by a bus slave (e.g., AIB slave 406). In some implementations, one or more process blocks of FIGS. 10A and 10B may be performed by another device or a group of devices separate from or including the bus slave. Additionally, or alternatively, one or more process blocks of FIGS. 10A and 10B may be performed by one or more components of an apparatus, any or all of which may be means for performing the operations of process 1000.

As shown in FIG. 10A, process 1000 may include, at block 1002, receiving, from a bus master, a serial clock over a first signal line. Means for performing the operation of block 1002 may include any component of any of the apparatuses described herein. For example, the AIB slave 406 may receive SCLK from an AIB master 404. The AIB master 404 and the AIB slave 406 may be on different dies, as shown in FIG. 7, or on the same die, such as the main die 402 shown in FIG. 4.

As further shown in FIG. 10A, process 1000 may include, at block 1004, performing a bus operation with the bus master, the bus operation comprising a read operation or a write operation. Means for performing the operation of block 1004 may include any component of any of the apparatuses described herein. For example, the AIB slave 406 may perform a bus operation with the AIB master 404.

FIG. 10B illustrates operations that are performed by the bus slave during a read operation. As shown in FIG. 10B, the read operation 1004 may include, at block 1006, receiving a read command from the bus master via a bus comprising at least one bidirectional input/output (I/O) channel, each I/O channel having its own respective signal line. The read operation 1004 may further include, at block 1008, receiving a read address from the bus master via the bus.

The read operation 1004 may optionally include, at block 1010, asserting a wait state. In some aspects, the AIB slave 406 may assert the wait state by driving the CC signal to a value that indicates assertion of the wait state to the AIB master 404 (in some aspects, a logic "0"). The AIB slave 406 remains in the wait state until it is ready to send read data to the AIB master 404.

The read operation 1004 may further include, at block 1012, sending read data to the bus master via the bus according to the serial clock, and, at block 1014, sending a copy of the serial clock to the bus master over a second signal line for use by the bus master as a data strobe. If the AIB slave 406 asserted the wait state in optional block 1010, sending the serial clock on the CC signal is an event that notifies the AIB master 404 that the wait state is over.

In some aspects, the bus comprises four bidirectional I/O channels.

In some aspects, after receiving the read address and before sending the read data, the bus slave may assert a wait state, during which the copy of the serial clock is not sent to the bus master over the second signal line.

In some aspects, performing the write operation comprises receiving a write command from the bus master via the bus, receiving a write address from the bus master via the bus, and receiving write data from the bus master via the bus.

In some aspects, after receiving the write address, and before receiving the write data, the bus slave may detect assertion and later release of a wait state by the bus master, via the second signal line.

Process 1000 may include additional implementations, such as any single implementation or any combination of implementations described below and/or in connection with one or more other processes described elsewhere herein. Although FIGS. 10A and 10B show example blocks of process 1000, in some implementations, process 1000 may include additional blocks, fewer blocks, different blocks, or differently arranged blocks than those depicted in FIGS. 10A and 10B. Additionally, or alternatively, two or more of the blocks of process 1000 may be performed in parallel.

The systems and methods disclosed herein have several technical advantages over serial communication buses commonly used for communication between dies or chiplets on a multi-chip module. For example, because the AIB slave provides the AIB master with a read strobe for use by the AIB master to latch the read data being provided by the AIB slave, the read strobe will be at the intended location relative to the data transitions on the bus and will thus be more likely to satisfy setup and hold requirements at higher frequencies and/or over longer distances, compared to bus protocols that use a clock provided by the bus master to capture data provided by a bus slave. The use of an AFIFO to store the captured read data allows the captured read data to be accessed according to the internal timing of the die that contains the AIB master. The additional CC signal provided according to the subject matter described herein can also be used by the AIB master or the AIB slave to indicate a wait state.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Various components as described herein may be implemented as application specific integrated circuits (ASICs), programmable gate arrays (e.g., FPGAs), firmware, hardware, software, or a combination thereof. Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to", "instructions that when executed perform", "computer instructions to" and/or other structural components configured to perform the described action.

Those of skill in the art will further appreciate that the various illustrative logical blocks, components, agents, IPs, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, processors, controllers, components, agents, IPs, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium or non-transitory storage media known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method, performed by a bus master of a serial bus, the method comprising:
    sending, to a bus slave, a first serial clock over a first signal line; and
    performing a bus operation with the bus slave, the bus operation comprising a read operation or a write operation;
    wherein performing the read operation comprises:
        sending a read command and a read address to the bus slave via a bus comprising one or more bidirectional channels;
        receiving, from the bus slave over a second signal line, a data strobe signal;
        latching read data provided by the bus slave via the bus into an asynchronous, first-in, first-out (AFIFO) buffer using the data strobe signal, wherein the read data is substantially edge aligned with one of a rising edge or a falling edge of the data strobe signal and substantially center aligned with the other of the rising edge or the falling edge of the data strobe signal; and
        reading the read data from the AFIFO buffer using a master clock, the master clock comprising a second serial clock that is distinct from the first serial clock and the data strobe signal.

2. The method of claim 1, wherein the bus comprises four bidirectional channels.

3. The method of claim 1, wherein performing the write operation comprises:
    sending a write command to the bus slave via the bus;
    sending a write address to the bus slave via the bus; and
    sending write data to the bus slave via the bus.

4. The method of claim 3, further comprising, after sending the write address, and before sending the write data, asserting and later releasing a wait state, via the second signal line.

5. A method, performed by a bus slave of a serial bus, the method comprising:
    receiving, from a bus master, a serial clock over a first signal line; and
    performing a bus operation with the bus master, the bus operation comprising a read operation or a write operation;
    wherein performing the read operation comprises:
        receiving a read command and a read address from the bus master via a bus comprising one or more bidirectional channels;
        sending read data to the bus master via the bus according to the serial clock; and
        sending, to the bus master over a second signal line, a data strobe, wherein the read data is substantially edge aligned with one of a rising edge or a falling edge of the data strobe and substantially center aligned with the other of the rising edge or the falling edge of the data strobe.

6. The method of claim 5, wherein the bus comprises four bidirectional channels.

7. The method of claim 5, further comprising, after receiving the read address and before sending the read data, asserting a wait state, during which the data strobe is not sent to the bus master over the second signal line.

8. The method of claim 5, wherein performing the write operation comprises:
    receiving a write command from the bus master via the bus;
    receiving a write address from the bus master via the bus; and
    receiving write data from the bus master via the bus.

9. The method of claim 8, further comprising, after receiving the write address, and before receiving the write data, detecting assertion and later release of a wait state by the bus master, via the second signal line.

10. An apparatus for operating as a bus master of a serial bus, the apparatus comprising:
    a controller circuit; and
    at least one input, output, or input/output port;
    wherein the controller circuit is configured to perform a bus operation with a bus slave, the bus operation comprising a read operation or a write operation;
    wherein, to perform the read operation, the controller circuit is configured to:
        send a first serial clock to the bus slave over a first signal line;
        send a read command and a read address to the bus slave via a bus comprising one or more bidirectional channels;
        receive, from the bus slave over a second signal line, a data strobe signal;
        latch read data provided by the bus slave via the bus into an asynchronous first-in, first-out (AFIFO) buffer using the data strobe signal, wherein the read data is edge aligned with one of a rising edge or a falling edge of the data strobe signal and center aligned with the other of the rising edge or the falling edge of the data strobe signal; and
        read the read data from the AFIFO buffer using a master clock, the master clock comprising a second serial clock that is distinct from the first serial clock and the data strobe signal.

11. The apparatus of claim 10, wherein the bus comprises four bidirectional channels.

12. The apparatus of claim 10, wherein, to perform the write operation, the controller circuit is configured to:
    send a write command to the bus slave via the bus;
    send a write address to the bus slave via the bus; and
    send write data to the bus slave via the bus.

13. The apparatus of claim 12, wherein the controller circuit is further configured to assert and later release a wait state, via the second signal line, after sending the write address but before sending the write data.

14. An apparatus for operating as a bus slave of a serial bus, the apparatus comprising:
    a controller circuit; and
    at least one input, output, or input/output port;
    wherein the controller circuit is configured to perform a bus operation with a bus master, the bus operation comprising a read operation or a write operation;
    wherein, to perform the read operation, the controller circuit is configured to:
        receive, from the bus master, a serial clock over a first signal line;
        receive a read command and a read address from the bus master via a bus comprising one or more bidirectional channels;
        send read data to the bus master via the bus according to the serial clock; and
        send, to the bus master over a second signal line, a data strobe signal, wherein the read data is edge aligned with one of a rising edge or a falling edge of the data strobe signal and center aligned with the other of the rising edge or the falling edge of the data strobe signal.

15. The apparatus of claim 14, wherein the bus comprises four bidirectional channels.

16. The apparatus of claim 14, wherein the controller circuit is further configured to assert and later release a wait state after receiving the read address and before sending the read data, via the second signal line, during which the data strobe signal is not sent to the bus master over the second signal line.

17. The apparatus of claim 14, wherein, to perform the write operation, the controller circuit is configured to:
   receive a write command from the bus master via the bus;
   receive a write address from the bus master via the bus; and
   receive write data from the bus master via the bus.

18. The apparatus of claim 17, further comprising, after receiving the write address, and before receiving the write data, detecting assertion and later release of a wait state by the bus master, via the second signal line.

\* \* \* \* \*